United States Patent [19]

Mitchell et al.

[11] Patent Number: 5,164,981
[45] Date of Patent: Nov. 17, 1992

[54] VOICE RESPONSE SYSTEM WITH AUTOMATED DATA TRANSFER

[75] Inventors: James Mitchell, Windham, N.H.; Malcom B. Strandberg, Cambridge, Mass.

[73] Assignee: Davox, Billerica, Mass.

[21] Appl. No.: 532,453

[22] Filed: Jun. 4, 1990

[51] Int. Cl.5 ................. H04M 1/64; H04M 3/50; H04M 3/58.
[52] U.S. Cl. ........................ 379/88; 379/96; 379/97; 379/212; 379/218
[58] Field of Search .............. 379/88, 67, 89, 84, 379/91, 97, 212, 214, 218, 96

[56] References Cited

U.S. PATENT DOCUMENTS

| | | | |
|---|---|---|---|
| 4,071,698 | 1/1978 | Barger, Jr. et al. | 379/84 |
| 4,763,353 | 8/1988 | Canale et al. | 379/157 |
| 4,785,408 | 11/1988 | Britton et al. | 364/513.5 |
| 4,797,911 | 1/1989 | Szlam et al. | 379/67 |
| 4,817,130 | 3/1989 | Frimmel, Jr. | 379/88 |
| 4,829,514 | 5/1989 | Frimmel, Jr. et al. | 379/89 X |
| 4,845,739 | 7/1989 | Katz | 379/92 |
| 4,908,850 | 3/1990 | Masson et al. | 379/88 |
| 4,922,519 | 5/1990 | Daudelin | 379/67 |
| 4,926,462 | 5/1990 | Ladd et al. | 379/67 |

OTHER PUBLICATIONS

"Conversant 1 Voice Systems: Architecture and Applications", R. J. Perdue et al., *AT&T Tech. Journal*, vol. 65, No. 5, Sep./Oct. 1986, pp. 34-47.

*Primary Examiner*—Thomas W. Brown
*Attorney, Agent, or Firm*—Weingarten, Schurgin, Gagnebin & Hayes

[57] ABSTRACT

A voice response system for providing interactive data exchange between an outside party, an operator and one or more data bases wherein a voice path switch initially connects an outside party to a database through a voice response unit. The voice response unit provides digitized voice prompts and questions to the outside party. The outside party responds to the prompts by entering selected numbers on a telephone touchtone keypad. The voice response unit then converts data from the database to voice signals recognizable by the outside party. The voice response unit or the outside party may selectively transfer the transaction to a human operator. In addition to providing transfer of voice signals from the voice response system to an operator, the system provides the operator with a list of information transacted thus far between the outside party and the voice response unit. The system also includes a workstation programmable function feature which performs a selected task upon the occurrence of a predetermined event such as receiving data at the operator workstation or removing or replacing the operator telephone handset.

30 Claims, 3 Drawing Sheets

VOICE RESPONSE SYSTEM WITH AUTOMATED DATA TRANSFER

FIELD OF THE INVENTION

The present invention relates to data base information retrieval systems and in particular, to data base information retrieval systems utilizing a telephone and including computerized voice response units and human operators.

BACKGROUND OF THE INVENTION

Service facilities which require access to a customer account data or which provide customer account data to incoming callers requesting such information typically have used operators to access and provide the requested data. Typically, a caller initiates the transaction by calling into the system, whereupon he may be placed on hold until an operator becomes available, resulting in time lost while remaining on hold. After an operator becomes available, the operator queries the incoming caller for the basic account identification information necessary to retrieve some or all of the customer file information. Again, more time is lost in the transaction with this preliminary exchange of information. Eventually, all necessary questions are posed and the desired information is available and communicated by the operator to the calling party. Having communicated the requested information, the transaction is terminated, and the operator is available for the next transaction.

Other data retrieval systems incorporate a computer voice response unit which provides limited computer prompted queries and limited voice responses to the caller. Such a system is disclosed in U.S. Pat. No. 4,797,911. In this system, the caller responds to the prompt queries by entering a selected number sequence on the DTMF (touchtone) keypad of the caller's telephone. However, as the computer voice response unit cannot be programmed to anticipate all questions, the menu of prompting questions provided to the caller and the overall efficiency of the unit is somewhat limited. For example, if the outside party requests to be transferred to an operator for additional help or information, the operator is at most, only apprised of the calling party's name, account number and perhaps his or her telephone number. The operator is without knowledge as to the reason for the caller's transfer as well as the status of the information exchanged thusfar between the outside party and the voice response unit.

Accordingly, merely combining a computer voice response unit and an operator-based data recovery system results in some redundant operations wherein the operator must typically repeat the inquiry previously posed by the computer voice response unit and previously answered by the calling party. Therefore, the resulting system combination provides only a limited improvment in service efficiency.

SUMMARY OF THE INVENTION

The voice response system according to the present invention provides rapid telephone access to customer data base information and provides efficient use of facility resources by initially connecting an outside party on a telephone apparatus to a data base through a computerized voice response unit providing digitized voice prompts, questions and other informational prompts to the outside party. The outside party responds to the prompts by entering a selected sequence of numbers on the telephone touchtone keypad. For the majority of users, the system according to the present invention provides substantially all of the requested information. For information not referenced in the prerecorded computerized voice response queries or prompts or when the system detects that the outside party needs to be connected to an operator, either the outside party or the system itself may selectively transfer the transaction to a human operator to provide the remaining information. According to the present invention, in addition to providing a transfer of voice signals from the computerized voice response unit to an operator, the system provides the operator with a list of information transacted thus far, as well as other information, such as calling party identity and account status. Thus, according to the present invention, telephone data base inquiries are handled with increased efficiency and speed by reducing the redundant operations by either the computerized voice response unit or the operator.

DESCRIPTION OF THE DRAWING

These and further features of the present invention will be better understood by reading the following detailed description, taken together with the drawing, wherein.

DETAILED DESCRIPTION OF THE INVENTION

Figure 1:
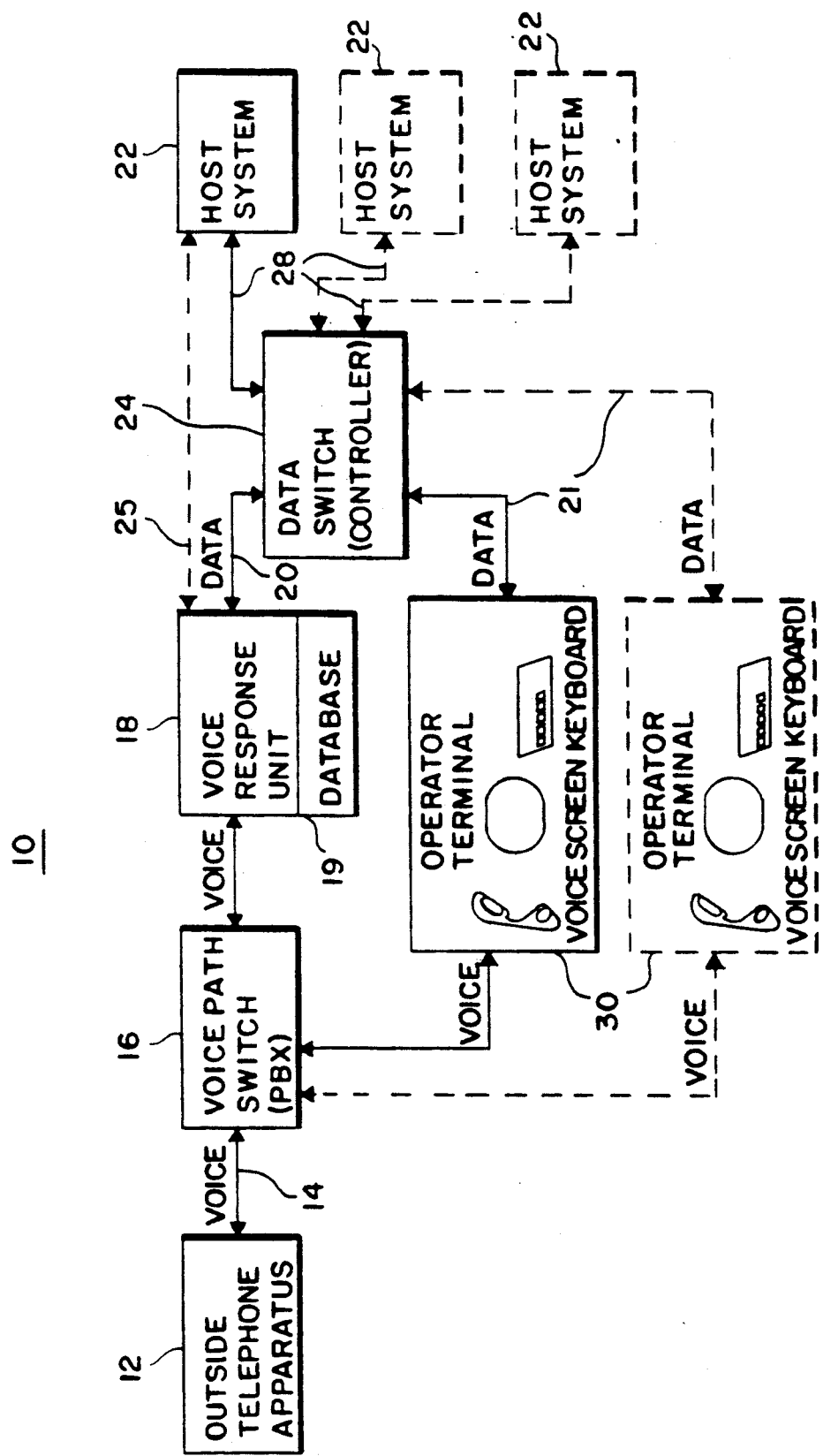
FIG. 1 is a simplified block diagram of the system according to the present invention.

The voice response system with automated data transfer according to this invention is illustrated in simplified block diagram 10, FIG. 1, wherein an outside telephone apparatus 12, such as a touchtone telephone at the disposal of an outside party is connected by means of a voice telephone line 14 to voice path switch 16. Voice path switch 16 is typically a private branch exchange (PBX) or other similar apparatus adapted for scanning a number of telephone lines and upon detection of an incoming ringing signal on one of the telephone lines or the answering of a telephone in the case of an outgoing call, for providing a voice path to voice response unit 18. Although shown as a separate functional unit, voice path switch 16 may form part of voice response unit 18.

Voice response unit 18 is essentially an automated operator, taking the place of a human operator for initially establishing interactive data exchange between outside telephone apparatus 12 and at least one data base 19 which may be included in the voice response unit 18 or included as part of one or more host system 22.

Upon establishing a voice link with outside telephone apparatus 12, voice response unit 18 plays a prerecorded message, prompting the user of outside telephone apparatus 12 to input selected information on the touchtone keypad or other similar mechanism associated with the outside telephone apparatus. Upon receipt of such telephone signals, voice response unit 18 converts the telephone signals to data signals. The voice response unit interprets the received telephone signals and initiates an appropriate response such as connecting the call to an operator or requesting data from a data base 19 or from host system 22. In the case where the system desires to access a host system, the voice response unit 18 may access host 22 directly over signal path 25, or may assert control signals over data path 20, directing data controller 24 to establish a data signal path 28 between at least one host system 22 and the voice response unit 18. Voice response unit 18 then provides interactive data exchange between data base 19 o: at least one host system 22 and the outside telephone apparatus 12, converting incoming telephone signals into data signals, and providing human recognizable audio output signals in response to data signals received from the data base or host system.

Upon receipt of selected telephone signals requesting transfer to an operator terminal or, based upon its own decisional criteria indicating such a transfer is required, voice response unit 18 directs voice path switch 16 to redirect voice data path 14 from connection with the voice response system to a connection with one of operator terminals 30, selected from a list of one or more available operator terminals which is kept by the voice response unit 18. Voice response unit 18 also directs data controller 24, by means of control signals over data path 20, to provide data path 21 to the selected operator terminal. In another embodiment, data controller 24 may be replaced by a multiposition mechanical switch which is manually operated by an operator. Such a mechanical switch alternately connects an operator terminal 30 with voice response unit 18 and one or more host system 22. Subsequently, the voice response unit 18 transfers to the selected operator terminal 30, at least a portion of the transactional information it has stored in its transactional memory. Such transactional information includes telephone signals received from outside telephone apparatus 12 as well as data received from host system 22. This information provides operator terminal 30 with a transactional history of what has thus far occurred during the interactive data exchange between the host system and the outside Party. Accordingly, an operator at the selected operator terminal is immediately apprised of the prior history of the interactive data exchange as well as the nature of, and reason for, transfer of the call to the operator.

The voice response system with automated data transfer feature of the present invention is equally well adapted for placing outgoing calls as is utilized in a debt collection system, and for receiving incoming calls as is required in a loan servicing organization receiving constant inquiries from debtors requesting account information. Accordingly, although the following description will utilize the processing of an incoming telephone call for illustrative purposes only, this is not a limitation of the present invention.

Figure 2:
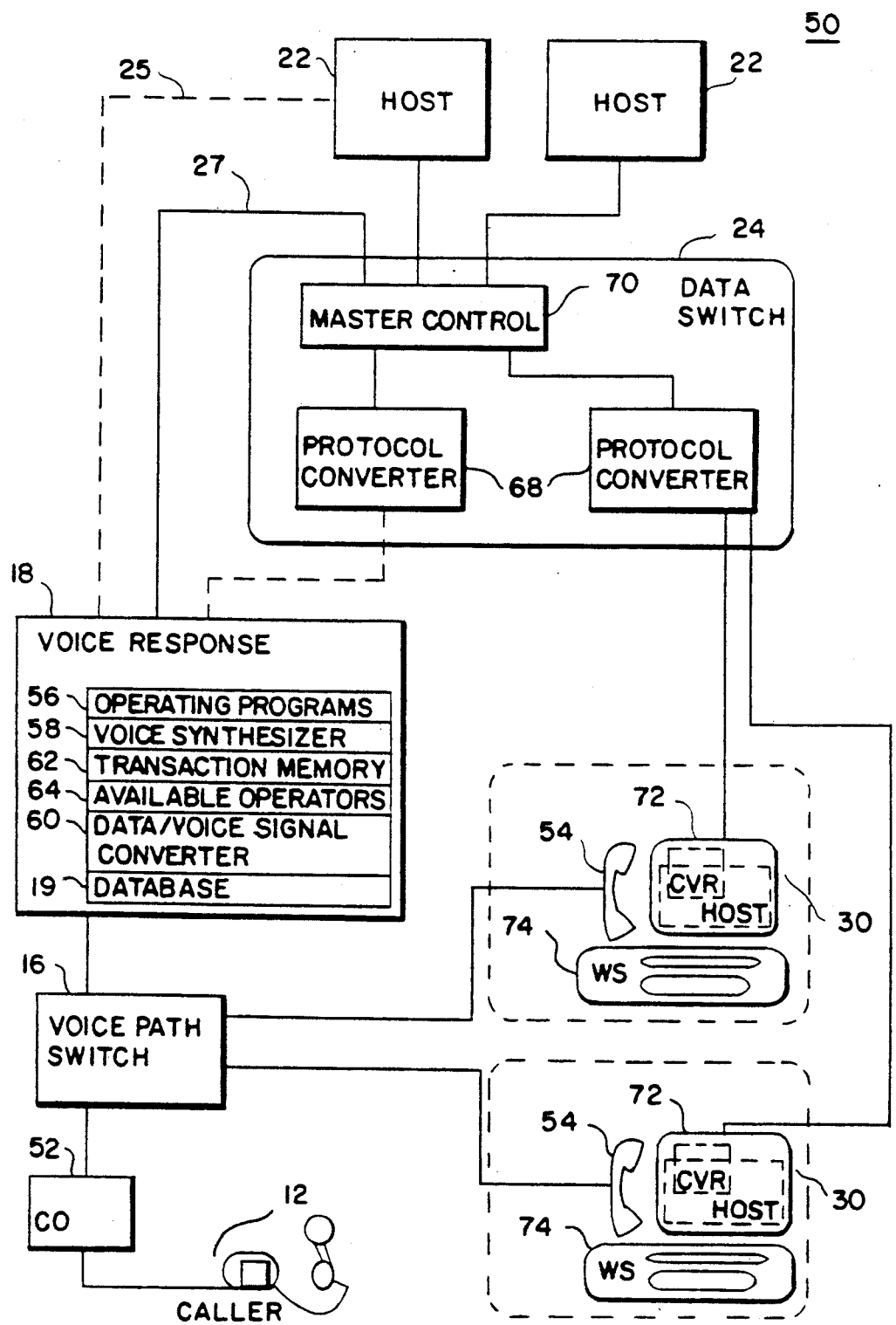
FIG. 2 is a more detailed block diagram of the system illustrated in FIG. 1.

As illustrated in the more detailed block diagram 50, FIG. 2, a caller utilizing outside telephone apparatus 12 initiates a call through a central office 52 of the telephone company. The call is received by the voice path switch 16. The voice path switch 16 selectively provides a voice path to voice response unit 18 or one of a plurality of operator telephones 54 which are part of operator terminals 30, under control of the voice response unit.

In the preferred embodiment, the voice response unit 18 provides selective control of voice path switch 16 by means of operating programs 56 resident in the voice response unit 18. Upon detecting an incoming telephone call, voice response unit 18 directs voice synthesizer unit 58 to play a prerecorded, predetermined message such as an option menu, and awaits the caller's response. Such a voice synthesizer and data/voice converter are well known in the art and are available from the VCT division of Davox as VCT Series 2000 TM or Dectalk TM phonic synthesizer available from Digital Equipment Corporation. The voice response unit receives the response from the caller in the form of touchtone (DTMF) signals or other similar type of signaling means and converts the signals to data signals in data/voice signal converter 60. The converted signals may then be stored in transaction memory 62. In response to the received telephone signals, the voice response system performs an appropriate task such as retrieving data from one or more host systems 22, or directing voice path switch 16 to connect the caller to operator telephone 54.

In the event that the caller requests information requiring access to data stored on host system 22, the voice response system according to the present invention directs data controller 24 to establish a data signal path between a host system 22 and voice response unit 18. Voice response unit 18 then requests the selected data from host system 22. The selected data is provided to the voice response unit 18 which utilizes voice synthesizer 58 under control of operating programs 56 to convert the data to human recognizable audio signals which are then provided to the caller by means of voice path switch 16.

When the caller by his responses to inquiries or options presented by voice response unit 18 requests to be connected to an operator, the voice response system directs data controller 24 to establish a data signal path between the voice response unit 18 and an available operator terminal 30 which is selected from a list 64 of available operator terminals which is maintained and updated in the voice response unit 18. Voice response unit 18 also directs voice path switch 16 to establish a voice signal path between caller 12 and operator terminal telephone 54.

Alternatively, voice response unit 18 may itself direct voice path switch 16 to connect a caller with an available operator. Such a case would arise when, for example, a calling party has repeatedly entered an incorrect or invalid identification or account number. In such a situation, voice response unit 18 directs voice path switch 16 to establish a voice signal path between an available operator terminal 30 and caller 12, while simultaneously directing data controller 24 to establish a data signal path between the voice response unit and the available operator terminal. Additionally, voice response unit 18 transfers the contents of transaction memory 62 to the display of the available operator terminal so that an operator present at the operator terminal immediately becomes apprised of the fact that this caller had been denied access to a selected host system 22 because of the improper or incorrect entry or any other appropriate reason.

In one embodiment, data controller 24 simply serves to direct data between two of three different data sources and destinations such as between a host and the voice response unit; a host and an operator terminal; and the voice response unit and an available operator terminal. Such a device could include a manually operated multiposition switch and a dedicated signal path 25 between voice response unit 18 and host 22.

In the preferred embodiment, data controller 24 includes one or more protocol converters 68 which serve to convert data from a first protocol to a second protocol. For example, protocol converter 68 may convert asynchronous data received from a voice response unit or operator terminal to synchronous data which is transmitted through master controller element 70 to one or more hosts 22 or to voice response unit 18 over signal path 27. Master controller element 70, in response to selected control signals, provides the switching function of data controller 24 establishing the requested data signal paths between the selected data source and destination. Additionally, master controller element 70 provides control to protocol converters 68.

The interface between the master control element 70 and the host system 22 is configurable to support a plurality of hosts, such as one or more IBM or equivalent main frame computer which communicates according to the SNA or BSC format standards, or up to 120 asynchronous host systems.

The operator terminals 30 typically comprise any standard video terminal, a programmable computer terminal such as an IBM PC or other workstation keyboard/controller combination, along with a separate telephone apparatus. Alternatively, an enhanced processor workstation such as the Davox 5900 may be utilized which integrates a video terminal, programmable keyboard and a telephone into one unit. In either case, operator terminal 30 is software configurable to provide one or more user specified workstation programmable functions. Workstation programmable functions are initiated by the occurrence of a user specified predetermined event such as the operator lifting or resetting the telephone handset, the operator depressing a special function key, receipt of data in a specified data field by the terminal, or a predetermined time of day. The workstation programmable functions reside in memory of keyboard/controller 74 which forms a part of operator terminal 30. The workstation programmable function may perform a single, simple task such as requesting additional data from the host system or directing the master controller to provide a signal path to the voice response unit, or may institute a long series of more complex tasks such as writing data to the host system, generating a special report or printout based on the call handled and data received, and directing data switch 24 to return the operator station to available status.

Although such workstation programmable functions are resident in the memory of the operator workstation, all workstation programmable functions are stored in master control unit 70 of data controller 24. Upon powerup of an individual operator terminal 30, the operator terminal accesses the workstation programmable function storage area of master control unit 70 and requests the selected workstation programmable functions that a user has previously directed be installed on that particular operator terminal.

An example of a simple yet typical and useful workstation programmable function is illustrated herein. Upon the determination by voice response unit 18 that the caller is to be connected to an operator terminal, the voice response unit directs voice path switch 16 to establish a voice signal path between the caller and the operator terminal. Voice response unit 18 then sends the contents of its transactional memory 62 over signal path 27 through data controller 24 to video terminal 72 of operator terminal 30. The terminal displays the information received from the voice response unit on at least a portion of its display screen. Such information may include the caller's name, account number, and report that the customer had inquired about his or her account balance.

Upon receipt of the account number in the account field, the workstation programmable function running on the operator terminal directs data controller 24 to establish a data signal path between the operator terminal 30 and a host system 22. The workstation programmable function then utilizes the caller's account number to request a full account history of the caller's account from the host. This additional information is also displayed on video terminal 72 of operator terminal 30 along with the initial information received from the voice response unit. In this manner, the operator receives from the voice response system information which enables the operator to immediately determine that the caller is inquiring about his or her account balance. Almost simultaneously, the workstation programmable function retrieves from the appropriate host system 22, more detailed account information such as individual transaction information which enables the operator to immediately discuss with the caller any questions relating to individual transactions which comprise the caller's account. Accordingly, the operator need not request redundant or unnecessary information which the caller has already entered by means of touchtone keypad to the voice response system. Similarly, neither the operator nor the caller need wait while the operator keys in the caller's account number to request the detailed transactional information from the appropriate host system 22. All of these steps are performed automatically by the voice response unit 18 and the workstation programmable functions operating on operator terminal 30. A workstation programmable function may also be invoked by means of the operator depressing a user specified key.

Upon termination of the call, a workstation programmable function may notify the voice response unit that the call is complete and that the operator is available. Upon completion of the call, the workstation Programmable function may transfer the data from the operator terminal 30 directly to a selected host system 22.

Figure 3:
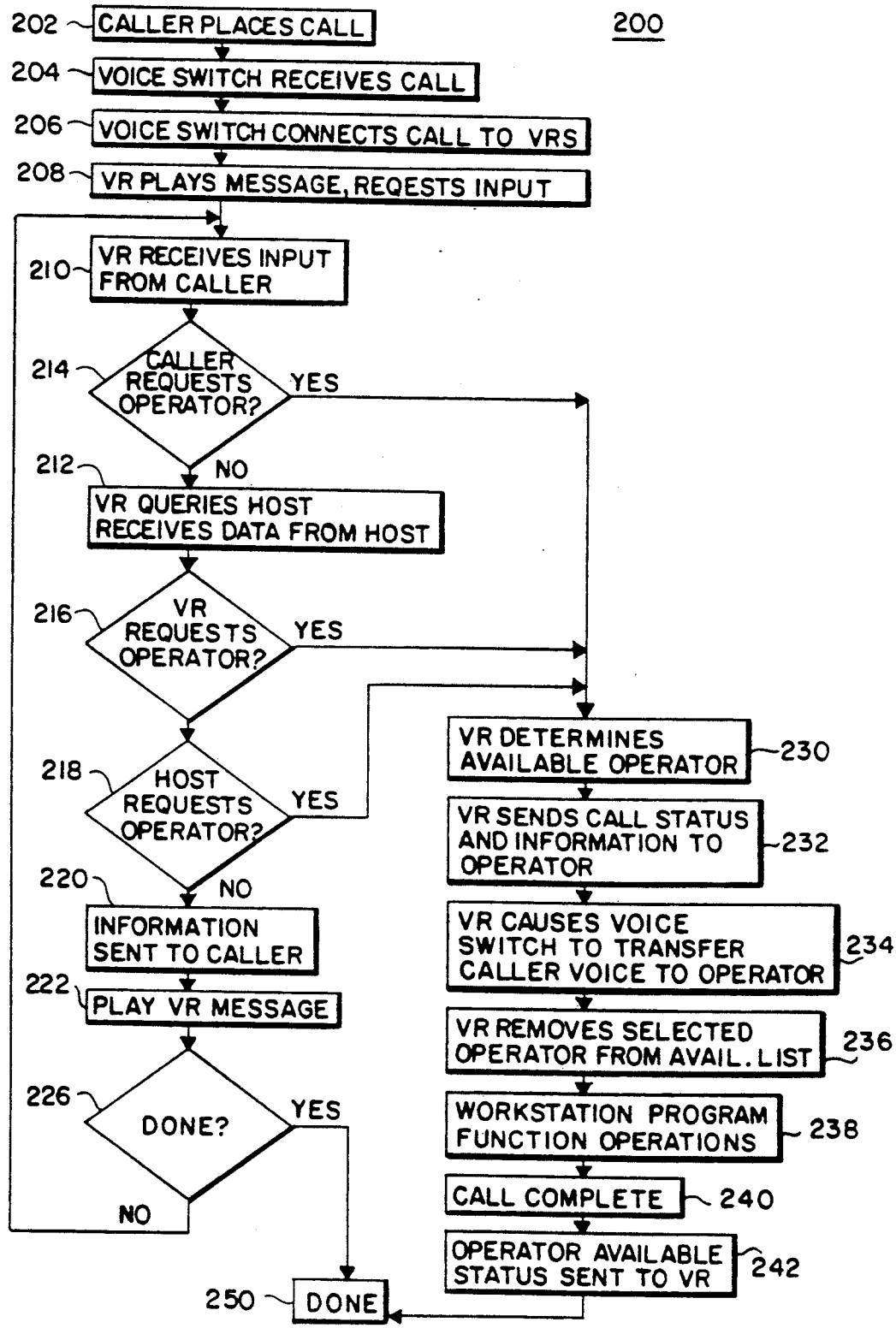
FIG. 3 is a flow chart of the operation of one embodiment of the present invention.

The operation of one embodiment of the present invention is illustrated by flow chart 200, FIG. 3, wherein the system is again described in terms of an incoming telephone call but this is not a limitation of the present invention. The caller places a call to the system 202. The call is detected and received by the voice path switch at step 204. The voice path switch connects the caller to the telephone interface and data/voice signal converter of the voice response unit at step 206, whereupon the voice response unit plays a prerecorded message requesting specific identification information from the caller at step 208. The caller responds by providing the information to the voice response unit by entering information on the telephone touchtone keypad at step 210. If the caller has not requested an operator, step 214, the voice response unit queries the host by providing the information entered by the caller and receiving data from the host system, step 212. Transfer from the voice response unit to operator intervention can be made if the caller requests operator intervention at step 214, or if the voice response unit itself determines operator intervention is appropriate at step 216. Alternately, if the host system determines according to the information requested, that operator intervention is necessary, transfer is provided at step 218. If no operator intervention is necessary, the voice response unit, in response to the data received from the host system, formats the appropriate message(s) at step 220, and provides such data in human recognizable audio signals to the caller at step 222. Once the requested information has been provided, the voice response unit inquires whether the caller is finished, step 226. If further information is requested, the system returns to step 210 and awaits input from the caller.

If, according to steps 214-218, operator intervention in the transaction is requested or appropriate, the voice response unit determines the next available operator terminal from a list of available operator terminals at step 230. The voice response unit directs the data controller to establish a signal path to the selected available operator terminal and sends the call status information to the selected operator terminal at step 232, including the listing of information transacted thus far during the call. The voice response unit then directs the voice path switch to transfer the call to the selected available operator telephone at step 234 and removes the selected operator from the list of available operators at step 236.

According to the Preferred embodiment of the present invention, one or more workstation programmable functions run on the operator terminal and are constantly monitoring the terminal's activities to provide direct access to specific customer data base information, or to execute other preselected tasks in response to one or more predetermined events, step 238.

When all requested information is provided and the transaction is completed at step 240, the call is completed and the operator availability status is sent to the voice response unit at step 242. Any other function to be accomplished by the specific workstation programmable function which is currently operating on the operator terminal is performed at this time or data stored for execution of the function at a later time. Thereafter, the transaction is completed at step 250.

Modifications and substitutions of the present invention by one of ordinary skilled in the art are considered to be within the scope of the present invention and the claims which follow.

We claim:

1. A voice response system providing interactive data exchange between a plurality of outside parties utilizing a plurality of outside telephone apparatus, a voice response unit, at least one operator terminal and at least one data base, comprising:

a voice response unit, responsive to telephone signals received from said plurality of outside telephone apparatus, for converting at least a portion of said received telephone signals to data signals, said data signals facilitating interactive data exchange between each of said plurality of outside parties utilizing said plurality of outside telephone apparatus and said at least one data base; for providing human recognizable audio output signals to said plurality of outside parties in response to data provided by said at least one data base and said telephone signals received from said plurality of outside telephone apparatus; and for storing a plurality of interactive data exchange records, each of said interactive data exchange records representing at least a portion of the interactive data exchange between one of said plurality of outside parties and said at least one data base;

a voice path switch, responsive to said voice response unit and to said telephone signals, for selectively connecting said telephone signals received from said plurality of outside parties utilizing said plurality of outside telephone apparatus to one of an operator terminal and said voice response unit dependent upon whether operator assistance is required for each of said plurality of outside parties;

at least one operator terminal, for transmitting and receiving telephone signals to and from at least one outside party utilizing at least one outside telephone apparatus and requiring operator assistance, and for transmitting and receiving data signals to and from said voice response unit and said at least one data base; and means responsive to said voice responsive unit and said at least one operator terminal, for selectively providing a first data signal path between said voice response unit and said at least one data base, for providing a second data signal path between said voice response unit and said at least one operator terminal, said second data signal path between said voice response unit and said at least one operator terminal for providing to said at least one operator terminal at least a portion of a selected interactive data exchange record stored by said voice response unit, said selected interactive data exchange record associated with telephone signals of said at least one outside party requiring operator assistance and presently selectively connected to said at least one operator terminal by said voice path switch and, said means further selectively providing a third data signal path between said at least one operator terminal and said at least one data base, for facilitating interactive data exchange between said at least one operator terminal and data stored on said at least one data base regarding said at least one outside party requiring operator assistance.

2. The system of claim 1 wherein said voice response unit includes said at least one data base.

3. The system of claim 1 further including at least one host system including said at least one data base.

4. The system of claim 1 wherein said means for providing said first, second and third data signal paths includes s data controller, for selectively connecting said voice response unit, said at least one data base and said at least one operator terminal, according to control signals provided by said voice response unit and said at least one operator terminal.

5. The system of claim 3 wherein said voice response unit receives said data from said at least one host system.

6. The system of claim 1 wherein said voice path switch includes a private branch exchange (PBX).

7. The system of claim 1 wherein said voice response unit includes said voice path switch.

8. The system of claim 4 wherein said at least one operator terminal is responsive to at least one user definable workstation programmable function, operative for automatically performing a selected task upon the occurrence of a predetermined event.

9. The system of claim 8 wherein said predetermined event includes receipt of specified data signals by said at least one operator terminal from said voice response unit.

10. The system of claim 9 wherein said selected task includes obtaining selected data from one of any a plurality of coupled data bases.

11. The system of claim 10 wherein obtaining selected data from any one of a plurality of coupled data bases includes obtaining selected data from said at least one data base.

12. The system of claim 8 wherein said predetermined event includes the termination of receipt of telephone signals by said operator terminal from said outside telephone apparatus.

13. The system of claim 8 wherein said at least one operator terminal includes an operator telephone apparatus.

14. The system of claim 13 wherein said predetermined event includes the answering and hanging up of said operator telephone apparatus.

15. The system of claim 14 wherein said selected task includes informing said voice response unit of operator terminal availability.

16. The system of claim 14 wherein said selected task includes writing selected data to said at least one data base.

17. The system of claim 8 wherein said predetermined event includes the receipt of a predetermined terminal key signal from said at least one operator terminal.

18. The system of claim 3 wherein said voice response unit provided interactive data exchange between said at least one host system and said plurality of outside telephone apparatus.

19. The system of claim 1 wherein said voice response unit provides voice prompts to said plurality of outside telephone apparatus.

20. The system of claim 1 wherein said at least one operator terminal displays said selected interactive data exchange record received from said voice response unit.

21. The system of claim 20 wherein said selected interactive data exchange record received from said voice response unit and additional data regarding said at least one outside party requiring operator assistance received from said at least one data base are displayed simultaneously on a single display screen of said operator terminal.

22. The system of claim 1 further including a plurality of operator terminals; and
wherein said voice response unit is adapted for selecting an available operator terminal from said plurality of operator terminals.

23. The system of claim 4 wherein said voice response unit provides said at least one operator terminal with said telephone signals and said selected interactive data exchange record prior to said data controller selectively connecting said at least one outside party requiring operator assistance with said at least one operator terminal.

24. The system of claim 4 wherein said data controller includes a protocol converter, for providing communication between any two of said at least one data base, said voice response unit and said at least one operator terminal.

25. The system of claim 24 wherein said protocol converter provides a conversion between asynchronous and synchronous data signals.

26. The system of claim 8 wherein said at least one work station programmable function is stored in a memory storage unit.

27. The system of claim 26 wherein said at least one operator terminal receives said at least one work station programmable function from said memory storage unit.

28. The system of claim 27 wherein said memory storage unit is located in said data controller.

29. A voice response system providing interactive data exchange between a plurality of outside parties utilizing a plurality of outside telephone apparatus, a voice response unit, at least one operator terminal and at least one host system, comprising:

a voice response unit coupled to said at least one host system, and responsive to telephone signals received from said plurality of outside telephone apparatus, for converting at least a portion of said received telephone signals to data signals, said data signals facilitating interactive data exchange between each of said plurality of outside parties utilizing said plurality of outside telephone apparatus and said at least one host system, for providing human recognizable audio output signals to said plurality of outside parties in response to data provided by said at least one host system and telephone signals received from said plurality of outside telephone apparatus; and for storing a plurality of interactive data exchange records, each of said interactive data exchange records representing at least a portion of the interactive data exchange between one of said plurality of outside parties and said at least one host system;

a voice path switch, responsive to said voice response unit and to said telephone signals, for selectively connecting said telephone signals received from said plurality of outside parties utilizing said plurality of outside telephone apparatus to one of an operator terminal and said voice response unit dependent upon whether operator assistance is required for each of said plurality of outside parties;

at least on operator terminal, for transmitting and receiving telephone signals to and from at least one outside party utilizing at least on outside telephone apparatus and requiring operator assistance, and for transmitting and receiving data signals to and from said voice response unit and said at least one host system; and a data controller, responsive to said voice responsive unit and said at least one operator terminal, for selectively connecting said voice response unit, said at least one host system and said at least one operator terminal, according to control signals provided by said voice response unit and said at least one operator terminal, for selectively providing a first data signal path between said voice response unit and said at least one host system, for providing a second data signal path between said voice response unit and said at least one operator terminal, said second data signal path between said voice response unit and said at leas one operator terminal for providing to said at least one operator terminal at least a portion of a selected interactive data exchange record stored by said voice response unit, said selected interactive data exchange record associated with telephone signals of said at least one outside party requiring operator assistance and presently selectively connected to said at least one operator terminal by said voice path switch and, said data controller further selectively providing a third data signal path between said at least one operator terminal and said at least one host system, for facilitating interactive data exchange between said at least one operator terminal and data stored on said at least one host system, said data associated with said at least on outside party selectively connected to said operator terminal and requiring operator assistance.

30. A voice response system providing interactive data exchange between a plurality of outside parties utilizing a plurality of outside telephone apparatus, a voice response unit, at least one operator terminal and at least one data base, comprising:

a voice response unit, responsive to telephone signals received from said plurality of outside telephone apparatus, for converting at least a portion of said received telephone signals to data signals, said data signals facilitating interactive data exchange between each of said plurality of outside parties utilizing said plurality of outside telephone apparatus and said at least one data base; for providing human recognizable audio output signals to said plurality of outside parties in response to data provided by said at least one data base and said telephone signals received from said plurality of outside telephone apparatus; and for storing a plurality of interactive data exchange records, each of said interactive data exchange records representing at least a portion of the interactive data exchange between one of said plurality of outside parties and said at least one data base;

a voice path switch, responsive to said voice response unit and to said telephone signals, for selectively connecting said telephone signals received from said plurality of outside parties utilizing said plurality of outside telephone apparatus to one of an operator terminal and said voice response unit dependent upon whether operator assistance is required for each of said plurality of outside parties;

at least one operator terminal, for transmitting and receiving telephone signals to and from at least one outside party utilizing at least one outside telephone apparatus and requiring operator assistance, and for transmitting and receiving data signals to and from said voice response unit and said at least one data base, and wherein said at least one operator terminal includes at least one workstation programmable function, operative for automatically performing a selected task upon the occurrence of a predetermined event; and means, responsive to said voice responsive unit and said at lease one operator terminal, for selectively providing a first data signal path between said voice response unit and said at least one data base, for providing a second data signal path between said voice response unit and said at least one operator terminal, said second data signal path between said voice response unit and said at least one operator terminal for providing to said at least one operator terminal at least a portion of a selected interactive data exchange record stored by said voice response unit, said interactive data exchange record associated with telephone signals of said at least one outside party requiring operator assistance and presently selectively connected to said at least one operator terminal by said voice path switch and, said means further selectively providing a third data signal path between said at least one operator terminal and said at least one data base, for facilitating interactive data exchange between said at lease one operator terminal and data stored on said at least one data base regarding said at least one outside party requiring operator assistance.

* * * * *